US011122174B2

(12) United States Patent
Suto et al.

(10) Patent No.: US 11,122,174 B2
(45) Date of Patent: Sep. 14, 2021

(54) IMAGE READING DEVICE AND IMAGE FORMING APPARATUS

(71) Applicant: SHARP KABUSHIKI KAISHA, Sakai (JP)

(72) Inventors: Yasuhiro Suto, Sakai (JP); Kenji Nakanishi, Sakai (JP); Shohichi Fukutome, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/870,467

(22) Filed: May 8, 2020

(65) Prior Publication Data
US 2020/0382667 A1 Dec. 3, 2020

(30) Foreign Application Priority Data

May 28, 2019 (JP) .............................. JP2019-099004

(51) Int. Cl.
*H04N 1/04* (2006.01)
*H04N 1/00* (2006.01)

(52) U.S. Cl.
CPC ..... *H04N 1/00525* (2013.01); *H04N 1/00557* (2013.01)

(58) Field of Classification Search
CPC ........... H04N 1/00525; H04N 1/00557; H04N 1/00559; H04N 1/04; H04N 1/1013; H04N 1/1039; H04N 1/0083
See application file for complete search history.

(56) References Cited

U.S. PATENT DOCUMENTS

| 7,587,795 | B2* | 9/2009 | Yamamoto | B60R 16/0215 174/117 F |
| 8,724,181 | B2* | 5/2014 | Fujiwara | H04N 1/1013 358/474 |
| 2001/0040705 | A1 | 11/2001 | Yokota | |
| 2008/0068679 | A1* | 3/2008 | Murai | H04N 1/00559 358/497 |
| 2009/0244655 | A1* | 10/2009 | Mukai | H04N 1/1026 358/474 |
| 2011/0211234 | A1* | 9/2011 | Kozaki | H04N 1/1017 358/474 |
| 2014/0085688 | A1* | 3/2014 | Kozaki | H04N 1/00907 358/482 |
| 2014/0153068 | A1* | 6/2014 | Xu | H04N 1/0083 358/497 |
| 2014/0160539 | A1* | 6/2014 | Wei | H04N 1/0083 358/494 |

(Continued)

FOREIGN PATENT DOCUMENTS

JP 2001-346006 A 12/2001

*Primary Examiner* — Cheukfan Lee
(74) *Attorney, Agent, or Firm* — ScienBiziP, P.C.

(57) ABSTRACT

An image reading device includes a housing with a document platen provided on an upper surface of the housing, a scanning body provided to be reciprocally movable in the housing, and a flat cable having one end connected with an image reader of the scanning body. The flat cable includes a follow-up deformed section deformable following a movement of the scanning body, and a bent section bent so that the flat cable is aligned in a main scanning direction. The bent section is arranged on a lower surface of a base of the scanning body, and a holder that holds the bent section is formed on the lower surface of the base.

7 Claims, 10 Drawing Sheets

(56) References Cited

U.S. PATENT DOCUMENTS

2015/0281483 A1\* 10/2015 Shiomi .............. H04N 1/00559
358/474
2017/0094094 A1\* 3/2017 Tanaka ................. H04N 1/1026

\* cited by examiner

IMAGE READING DEVICE AND IMAGE FORMING APPARATUS

BACKGROUND OF THE INVENTION

Field of the Invention

The present invention relates to an image forming apparatus and an image reading device, and in particular, to an image forming apparatus and an image reading device including a scanning body that reads an image of a document placed on a document platen.

Description of the Background Art

An example of conventional image reading devices is disclosed in Japanese Unexamined Patent Application Publication No. 2001-346006 (hereinafter, referred to as "Patent Document 1"). The image reading device in Patent Document 1 includes; an image reader; a document platen glass supported at a predetermined interval to the image reader, an upper surface of which serves as a document support surface; a contact-type image sensor that is provided in the image reader and reads an image of a document supported by the document platen glass; and a flat cable having one end connected with the image reader. A guide member of the flat cable, the guide member serving as a support that twists a flat portion of the flat cable in a vertical direction of the document platen glass, is arranged at a position separated from the carriage and at the right side of the carriage (at one side in the sub scanning direction).

In the technique of Patent Document 1, the guide member serving as the support that twists the flat portion of the flat cable in the vertical direction of the document platen glass is arranged at a position separated from the carriage and at the right side of the carriage (at one side in the sub scanning direction). Thus, a large space is required on the right side of a moving body, and the size of the image reading device increases in the sub scanning direction.

Therefore, a primary object of the present invention is to provide a novel image reading device and image forming apparatus.

Another object of the present invention is to provide an image reading device and an image forming apparatus that are downsized in the sub scanning direction.

SUMMARY OF THE INVENTION

According to a first aspect of the present invention, an image reading device includes a housing with a document platen provided on an upper surface of the housing, a scanning body including a base provided to be reciprocally movable in a sub scanning direction in the housing and an image reader that isp held by the base and reads a document placed on the document platen while moving in the sub scanning direction, and a flat cable having flexibility, one end of which is connected to the image reader to be parallel with the document platen. In this image reading device, the flat cable includes a follow-up deformed section and a bent section. The follow-up deformed section is wired to extend along the sub scanning direction and deforms following a movement of the scanning body. The bent section continues into a side of the one end of the follow-up deformed section, and is bent so that the flat cable is aligned in a main scanning direction to be parallel with the document platen. A holder that holds the bent section is formed on a lower surface of the base, and the bent section is arranged along the lower surface of the base.

According to the first aspect of the present invention, the bent section of the flat cable and the holder for the bent section are arranged on the lower surface of the base of the scanning body, and thus, the housing that accommodates the bent section and the holder, and the image reading device are downsized in the sub scanning direction.

According to a second aspect of the present invention depending on the first aspect of the present invention, the flat cable includes a coupling section continuing into the side of the one end of the bent section and extending to the one end along a side surface of the scanning body.

According to a third aspect of the present invention depending on the first or second aspect of the present invention, the image reading device includes a protrusion formed on the lower surface of the base to be inserted between the flat cable aligned in the main scanning direction in the bent section of the flat cable.

According to a fourth aspect of the present invention depending on the third aspect of the present invention, one end edge of the protrusion in the sub scanning direction restricts the bent section in the sub scanning direction.

According to a fifth aspect of the present invention depending on any one of the first to fourth aspects of the present invention, the scanning body includes a slider abutting against a lower surface of the document platen, and the slider is arranged within a width of the follow-up deformed section in the main scanning direction.

According to the fifth aspect of the present invention, the lifting of the base caused by the follow-up deformed section is prevented by the slider, and thus, the scanning body is reciprocated in a well-balanced manner.

According to a sixth aspect of the present invention depending on any one of the first to fifth aspect of the present inventions, the housing includes an upper housing that covers a peripheral edge of an upper surface of the document platen, and the follow-up deformed section is arranged at a position where the follow-up deformed section is covered from above by the upper housing.

According to the sixth aspect of the present invention, even if the follow-up deformed section contacts the lower surface of the document platen, and the document platen is stained, a portion where the upper housing is provided is outside an image reading area, and thus, image deterioration does not occur. Further, the stains are not visible to the user, and thus, the appearance of the image reading device does not deteriorate.

A seventh aspect of the present invention is an image forming apparatus including the image reading device according to any one of the first to sixth aspects of the present invention.

According to the seventh aspect of the present invention, a similar operation and effect as in the first aspect of the present invention are obtained, so that the image reading device can be downsized in the sub scanning direction, and the image forming apparatus can be also downsized in the sub scanning direction.

According to the aspect of the present invention, a bent section of the flat cable and a holder for the bent section are arranged on the lower surface of a base of a scanning body, and thus, a housing that accommodates the bent section and the holder, and an image reading device can be downsized in the sub scanning direction.

The above object, other objects, features, and advantages of the present invention will be more apparent from the detailed description of embodiments given below with reference to the drawings.

DESCRIPTION OF THE PREFERRED EMBODIMENTS

First Embodiment

Figure 1:
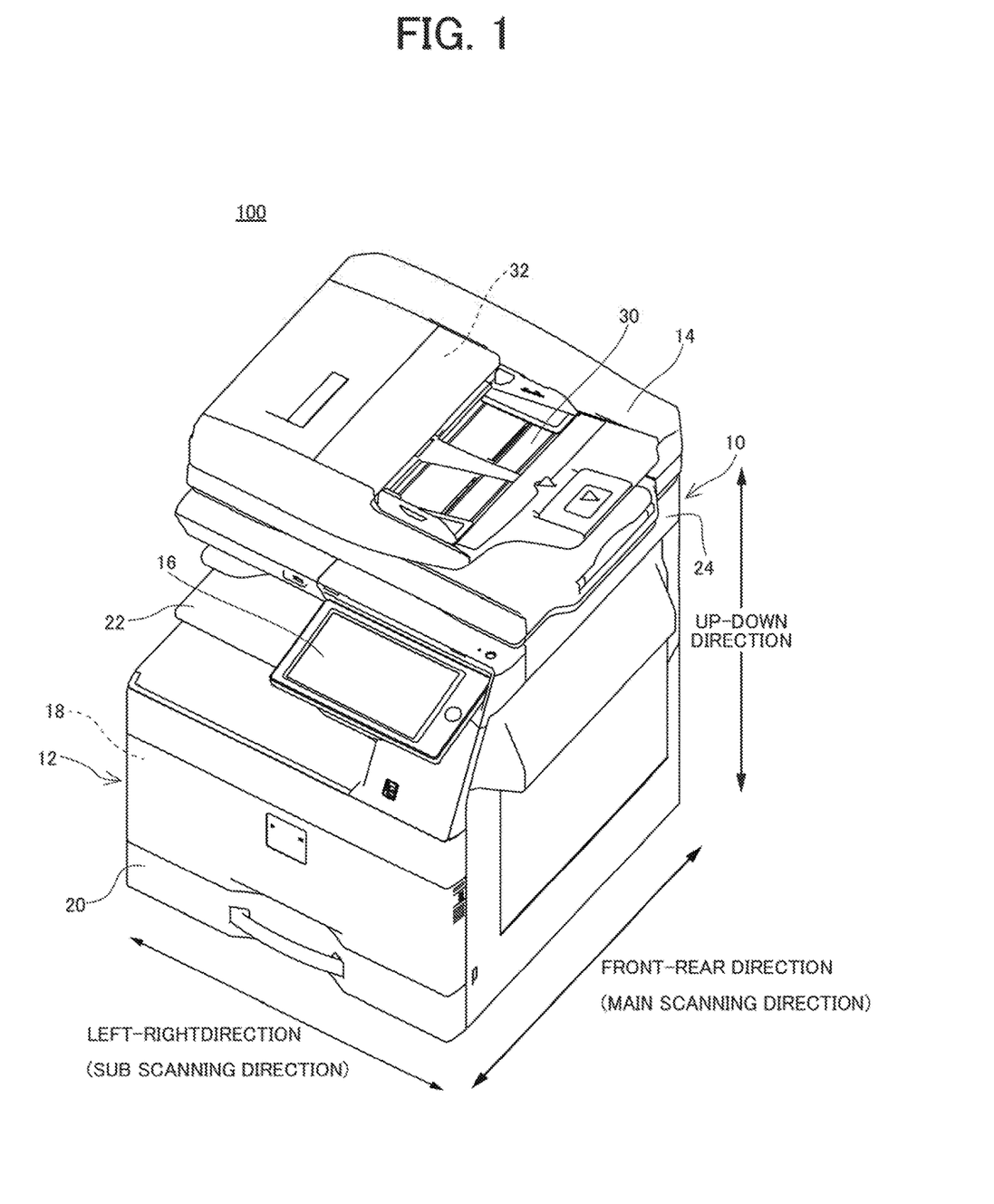
FIG. 1 is an illustrative view illustrating an appearance of an image forming apparatus including an image reading device according to a first embodiment of the present invention.

Referring to FIG. 1, an image reading device 10 according to a first embodiment of the present invention includes a scanning body (contact image sensor (CIS) scanning body 34) provided to be reciprocally movable in a sub scanning direction, and is employed in an image forming apparatus 100 such as a copying machine, a facsimile, a printer, and a multifunction peripheral including them. In the present embodiment, the image forming apparatus 100 is a multi-function peripheral OHO having a copying function, a printer function, a scanner function, a facsimile function, and the like. It may be sufficient that the image forming apparatus 100 includes at least the image reading device 10 (scanner function) capable of stationary-document-reading, and the above other functions may be optionally adopted.

First, a basic configuration of the image forming apparatus 100 will be generally described. In the present invention, a front-rear direction (depth direction) of the image forming apparatus 100 and the components thereof is defined by assuming a surface facing a standing position of a user, that is, a surface on a side where an operation processor 16 is provided, as a front surface (front), and a left-right direction (lateral direction) of the image forming apparatus 100 and the components thereof is defined with reference to a state in which the user views the image forming apparatus 100. Further, the longitudinal direction of the CIS scanning body 34 is referred to as a main scanning direction, and a direction orthogonal to the main scanning direction, in which the CIS scanning body 34 reciprocates is referred to as a sub scanning direction. In the first embodiment, the front-rear direction is the main scanning direction, and the left-right direction is the sub scanning direction.

As illustrated in FIG. 1, the image forming apparatus 100 includes an image forming apparatus main body 12 and the image reading device 10 arranged above the image forming apparatus main body 12, and the image forming apparatus 100 forms a multi-color or a single-color image on a predetermined sheet (recording paper), based on image data read by the image reading device 10 or image data transmitted from an external computer.

A controller (not illustrated) that controls operations of components of the image forming apparatus 100 is provided at a predetermined position in the image forming apparatus main body 12. The controller includes a central processing unit (CPU), a memory, and the like, and transmits, in response to an user input operation on the operation processor 16, or the like, a control signal to the components of the image forming apparatus 100 including the image reading device 10, to cause the image forming apparatus 100 to execute various operations.

Further, the image forming apparatus main body 12 includes therein an image former 18 including an exposer, a photosensitive drum, a charger, a developing device, a fixing roller, and the like. The image former 18 forms an image on a recording paper conveyed from a sheet feed cassette 20 or the like, and discharges the recording paper on which the image is formed to a discharge tray 22.

Figure 2:
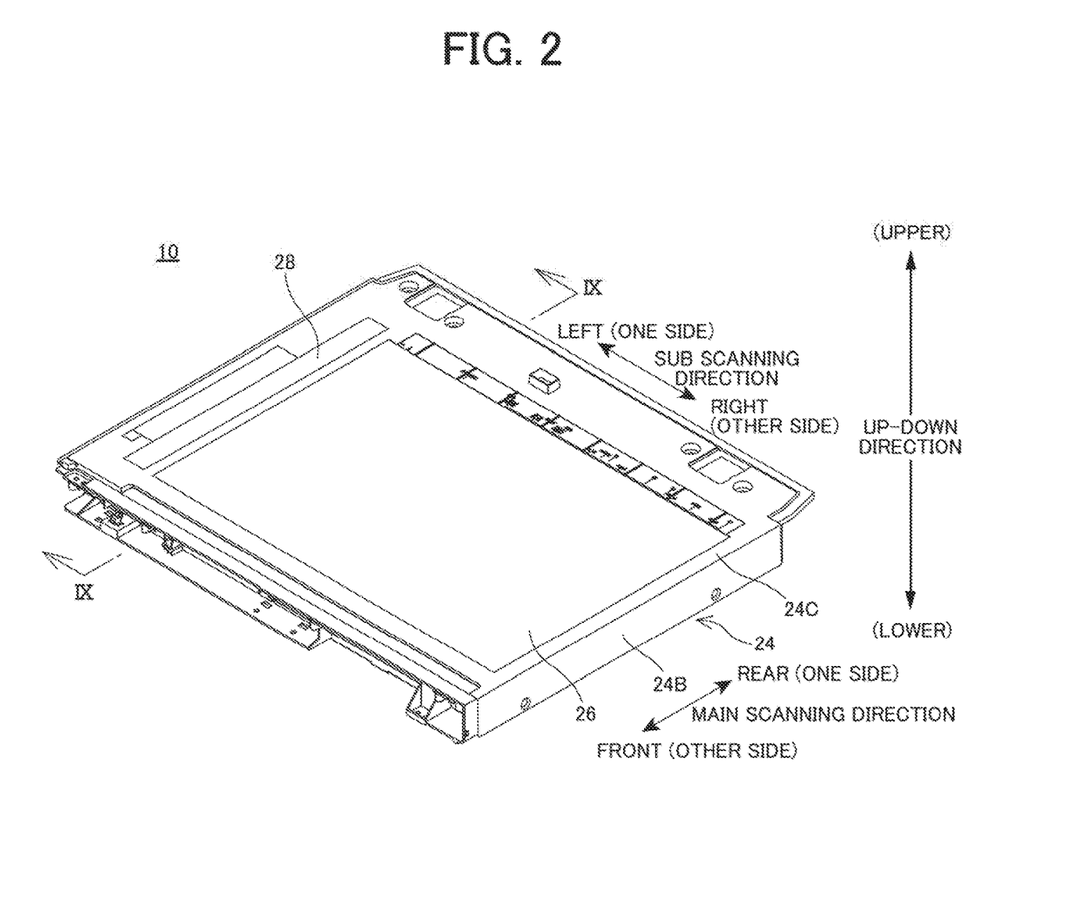
FIG. 2 is a perspective view illustrating an appearance of a main body portion of the image reading device.
Figure 3:
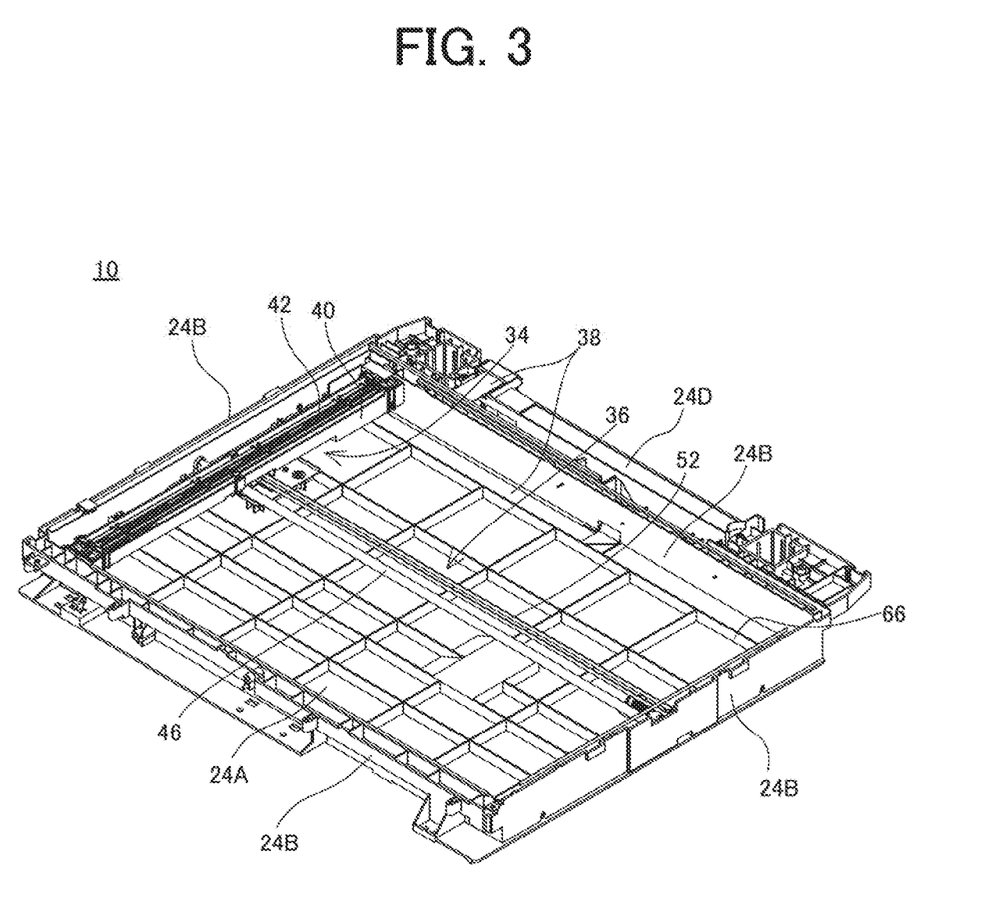
FIG. 3 is a perspective view illustrating an internal structure of the image reading device with an upper surface portion omitted.
Figure 4:
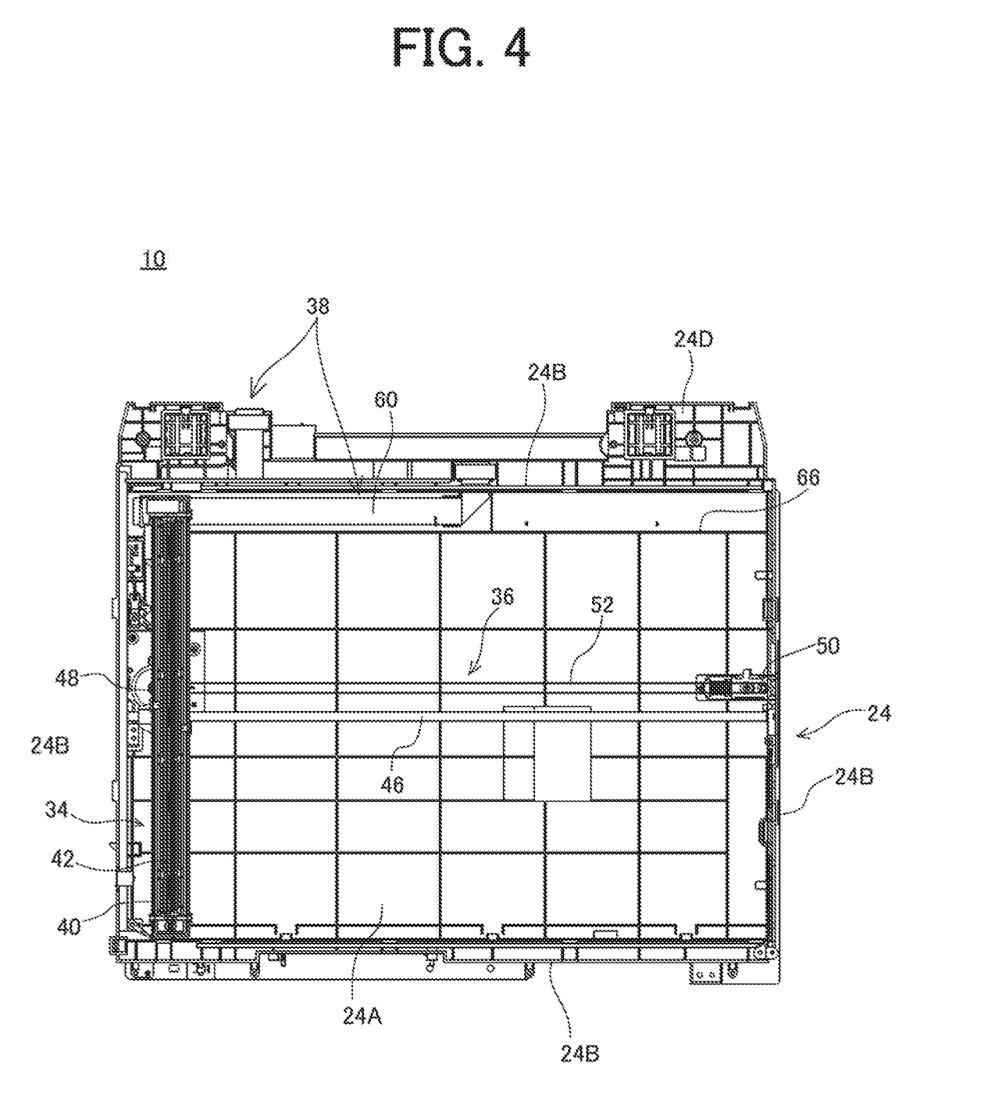
FIG. 4 is a plan view illustrating an internal structure of the image reading device with an upper surface portion omitted.

Referring to FIG. 2 to FIG. 4 together with FIG. 1, the image reading device 10 includes a housing 24 made of synthetic resin including a rectangular flat plate-shaped bottom plate 24a and four side walls 24b on the left, right, front, and rear rising from a peripheral portion of the bottom plate 24a. A document platen (also referred to as a platen glass) 26 and a sun protection factor (SPF) glass 28 formed of a transparent material are provided on the upper surface of the housing 24. After a document placed on a document tray 30 is conveyed, the SPF glass 28 serves as a glass through which the conveyed document is read.

The upper surfaces at the peripheral edges of the document platen 26 and the SPF glass 28 are covered by a frame-shaped upper housing 24c included in the housing 24. The upper housing 24c supports the document platen 26. The upper housing 24c may be attached to the upper surface of the document platen 26 with double-sided tape, for example, as support, or may be pressed from the upper surface of the upper housing 24c.

The document platen 26 and the SPF glass 28 may be configured by one plate body (single glass) or may be configured by separate bodies (separate glasses). Further, the upper housing 24c may also be configured by one member, or may be configured by combining a plurality of members.

A document pressing cover 14 is attached openably and closably above the housing 24 via a hinge or the like. A housing extension 24d is provided on a rear surface part of the housing 24 behind the rear side wall 24b, and an attachment part such as a hinge is provided on the housing extension 24d. The document pressing cover 14 is openable and closable so that the front side moves up and down with the hinge on the rear side as the opening/closing fulcrum.

The document pressing cover 14 is provided with an automatic document feeder (ADF) 32 that automatically feeds documents placed on the document tray 30 one by one to an image reading position. Further, the operation processor 16 including a touch panel display, operation buttons, and the like that receive a user input operation is provided on the front side of the housing 24.

Further, the contact image sensor (CIS) scanning body 34 that reads an image of a document placed on the document platen 26, a moving mechanism 36 that causes the CIS scanning body 34 to reciprocate, a flat cable 38 that transmits image data acquired by the CIS scanning body 34 to the controller, and the like are provided in the housing 24.

The CIS scanning body 34 is a so-called contact type image sensor, and includes a base (carriage) 40 provided to be reciprocally movable in the sub scanning direction (left-right direction), and an image reader 42 held by the base 40.

The base 40 is formed in a rectangular box shape with an open top, and is arranged in the housing 24 so that the longitudinal direction extends in the main scanning direction (front-rear direction). The image reader 42 includes a light source, a rod lens array, a plurality of image pickup elements (photoelectric conversion elements), and the like, which are arranged to extend long in the main scanning direction. The light source is, for example, a light-emitting diode (LED) array in which a plurality of LEDs are arranged, and irradiates a document surface. The rod lens array focuses light reflected from the document on the plurality of image pickup elements. The plurality of image pickup elements read pixel information of the image formed by the rod lens array. Further, a connector 44 (see FIG. 8) mounted on a circuit board is provided at a rear end of the image reader 42. The connector 44 is provided to be exposed on a side surface of the base 40, and one end of the flat cable 38 is connected to the connector 44.

The moving mechanism 36 includes a guide shaft 46 and a drive mechanism including a driving pulley 48, a driven pulley 50, a traction member 52, and the like. The guide shaft 46 guides the reciprocating movement of the CIS scanning body 34, and extends above the bottom plate 24a of the housing 24 in the sub scanning direction. A central part in the main scanning direction of the lower surface of the base 40 of the CIS scanning body 34 is movably supported by the guide shaft 46.

The driving pulley 48 is provided near one end of the guide shaft 46, and the driven pulley 50 is provided near the other end of the guide shaft 46. The endless belt-shaped traction member 52 is wound (wrapped) around the driving pulley 48 and the driven pulley 50, and the base 40 of the CIS scanning body 34 is coupled to the traction member 52. The driving pulley 48 is rotated by a motor (not illustrated) serving as a drive source, and transmits the driving force of the motor to the traction member 52. The traction member 52 is configured by a timing belt, a wire, a chain, or the like, and moves circumferentially with the rotation of the driving pulley 48 to pull the CIS scanning body 34. Thus, the CIS scanning body 34 reciprocates in the sub scanning direction along the guide shaft 46. Further, the driven pulley 50 applies a predetermined tension to the traction member 52, and rotates with the circumferential movement of the traction member 52.

The flat cable 38 is a flexible belt-shaped wiring member (flexible flat cable), and is formed by covering, with an insulator, a plurality of conductive wires arranged in parallel to each other. One end of the flat cable 38 is connected to the connector 44 of the image reader 42 and the other end of the flat cable 38 is connected to a connector of a controller (control board) arranged outside the housing 24, and thus, the image reader 42 and the controller are electrically connected. Further, the flat cable 38 includes a follow-up deformed section 60 wired to extend in the sub scanning direction in the housing 24, and the flat cable 38 is deformed following a movement of the CIS scanning body 34. A wiring structure of the flat cable 38 and a structure for holding the flat cable 38 by the CIS scanning body 34 will be described later.

When the image reading device 10 reads an image of a document placed on the document platen 26 (in the case of stationary-document-reading), the CIS scanning body 34 reciprocates below the document platen 26 in the sub scanning direction to read the image of the document and acquire image data of the document. The image data is transmitted through the flat cable 38 as an image signal to the controller (control board) that is arranged outside the housing 24 and to which the other end of the flat cable 38 is connected. In the image reader 42, the image signal is converted from an analog signal to a digital signal (by an analog-to-digital (A/D) conversion circuit), and the digital signal is transmitted through the flat cable 38. If a digital signal is transmitted instead of an analog signal by the flat cable 38, the flat cable 38 requires a larger width, however, the digital signal is less affected by noise than the analog signal, and thus, the image signal is less affected.

On the other hand, when the image reading device 10 reads an image of a document placed on the document tray 30 (in the case of moving document reading), the CIS scanning body 34 waits below a predetermined image reading position, and when the document conveyed by the ADF 32 passes through the image reading position, the image on the document is read to acquire the image data of the document.

Below, the wiring structure of the flat cable 38 and the structure for holding the flat cable 38 by the CIS scanning body 34 will be described in detail with reference to FIG. 3 and FIG. 4, and FIG. 5 to FIG. 9. First, the wiring structure of the flat cable 38 will be described.

The connector 44 of the image reader 42 is provided to be exposed from the base 40 at the lower part of one end surface (left side surface) of the CIS scanning body 34 in the sub scanning direction that is one end (rear end) of the CIS scanning body 34 in the main scanning direction. That is, the connector 44 is provided at the lower part of the left side surface of the rear end of the CIS scanning body 34. The connector 44 is arranged so that the longitudinal direction of the connector 44 extends in the main scanning direction, and one end of the flat cable 38 is connected to the connector 44 to be parallel with the document platen 26. It is noted that, in the description of the flat cable 38, the connector 44 side of the image reader 42 is referred to as one end side, and the connector side of the controller is referred to as the other end side.

The flat cable 38 includes the follow-up deformed section 60 to be deformed following a movement of the CIS scanning body 34. Specifically, the follow-up deformed section 60 includes an extension 60a provided on the other end side and a curved section 60h provided on the one end side. The extension 60a extends in the sub scanning direction along the upper surface of the bottom plate 24a of the housing 24 to be parallel with the document platen 26, and one end of the extension 60a is wired to pass below the CIS scanning body 34. The curved section 60b continues into one end side of the extension 60a, is curved in a U-shape on the left side of the CIS scanning body 34, and extends in parallel with the document platen 26 toward the CIS scanning body 34. The follow-up deformed section 60 follows a movement of the CIS scanning body 34 by being deformed to change the curved position of the follow-up deformed section 60 in the sub scanning direction as the CIS scanning body 34 reciprocates.

On the upper surface of the bottom plate 24a of the housing 24, ribs are formed in a lattice shape, and the follow-up deformed section 60 of the flat cable 38 is wired to pass between the rear side wall 24b and a boundary rib 66 formed on the rearmost side. The other end side of the follow-up deformed section 60 enters the housing extension 24d through an insertion hole formed in the rear side wall 24b, and further passes through the housing extension 24d to extend outside the housing 24. The other end of the flat cable 38 is connected to the connector of the controller provided at a predetermined position in the image forming apparatus main body 12.

Figure 5:
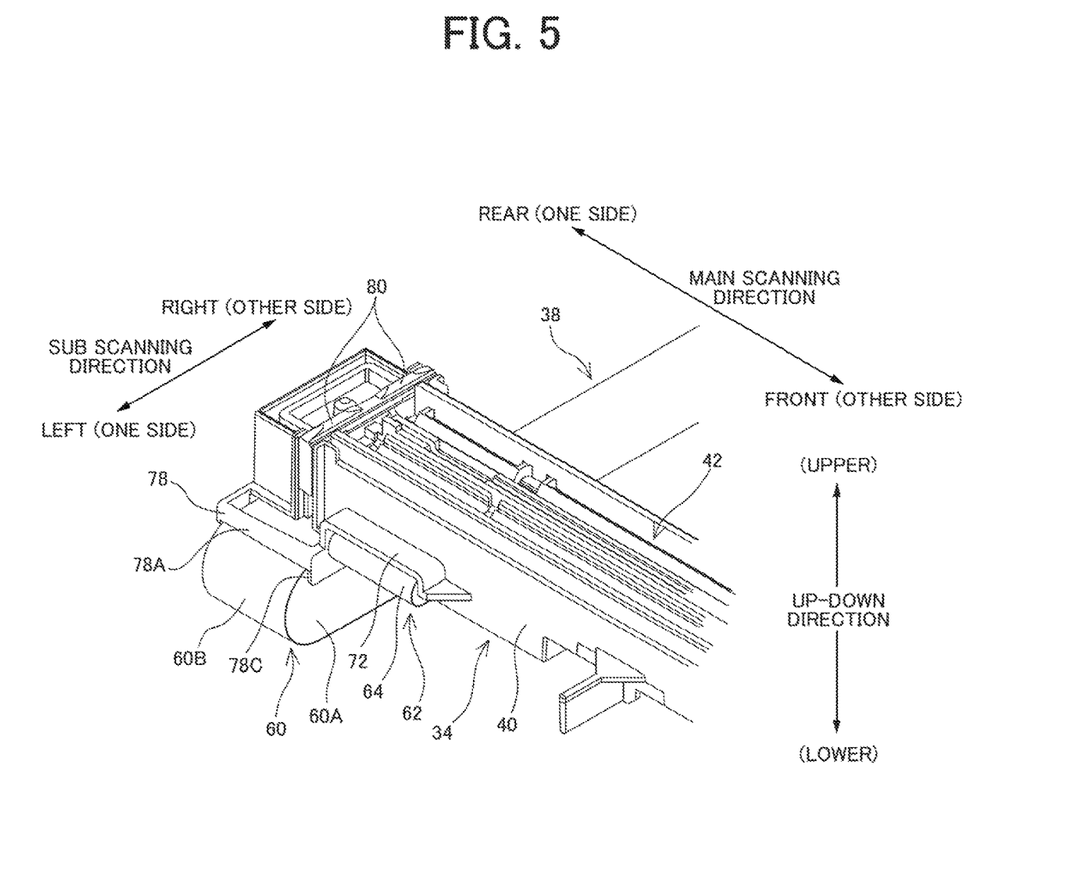
FIG. 5 is a first perspective view illustrating a rear end portion of a scanning body connected with a flat cable.
Figure 6:
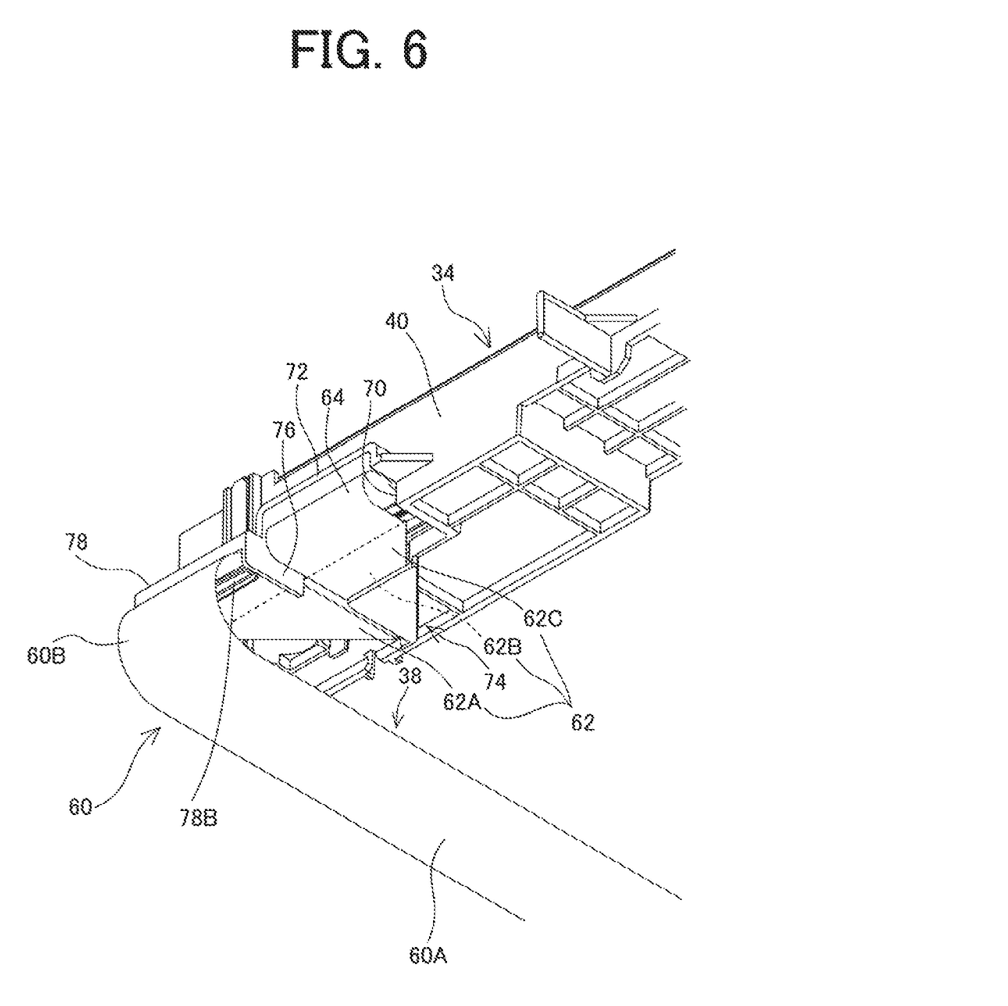
FIG. 6 is a second perspective view illustrating the rear end portion of the scanning body connected with the flat cable.
Figure 7:
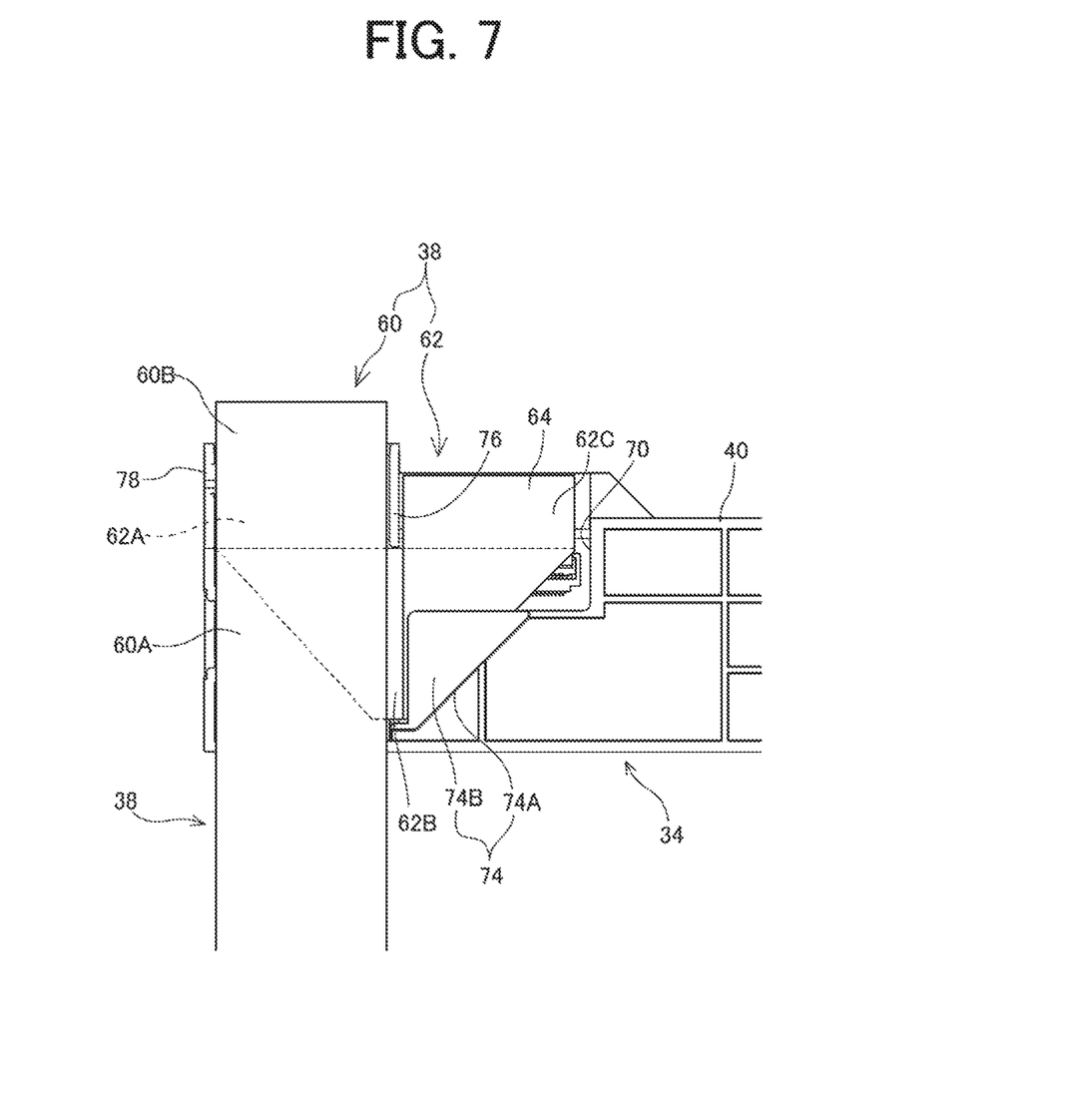
FIG. 7 is a bottom view illustrating the rear end portion of the scanning body connected with the flat cable.

Further, in the present embodiment, the flat cable 38 includes a bent section 62 continuing into one end side of the curved section 60b of the follow-up deformed section 60. The bent section 62 is formed by bending the flat cable 38 so that the flat cable 38 is aligned in the main scanning direction to be parallel with the document platen 26. Specifically, the bent section 62 includes a first section 62a that continues into one end side of the curved section 60b and extends in the sub scanning direction, a second section 62b that is bent at an angle of 90 degrees from one end side of the first section 62a to the front and extends in the main scanning direction, and a third section 62c that is bent at an angle of 90 degrees from one end side of the second section 62b to the left and extends in the sub scanning direction with aligned with the first section 62a in the main scanning direction.

The bent section 62 is arranged along the lower surface of the base 40 of the CIS scanning body 34, and is held by a holder 74 of the base 40 described below in detail. One end side of the third section 62c of the bent section 62 continues into one end of the flat cable 38 connected to the connector 44, via a coupling section 64 curving upward along the side surface of the CIS scanning body 34 (that is, the coupling section 64 wired to pass through a position near the side surface of the CIS scanning body 34).

That is, in the first embodiment, the bent section 62 is formed in the flat cable 38 so that the wiring position of the follow-up deformed section 60 in the main scanning direction is shifted backward from the position of the connector 44. This is because, if the follow-up deformed section 60 is shifted to a position along the rear side wall 24b, the follow-up deformed section 60 is wired to pass through a position where the follow-up deformed section 60 is covered from above by the upper housing 24c, that is, to pass through a position hidden by the upper housing 24c in plan view (see FIG. 9). Further, in FIG. 9, a side surface 24c-1 on the left side (in FIG. 9) of the upper housing 24c is a placement reference for contacting an end of a document to adjust a position of the document when the document is placed in the main scanning direction. The side surface 24c-1 is on the front side of a front end 60c of the follow-up deformed section 60 in the main scanning direction. As a result, even if the follow-up deformed section 60 contacts the lower surface of the document platen 26 and the document platen 26 is stained or the document platen 26 be scratched, a portion where the upper housing 24c is provided is outside a mounting area where the document is mounted on the document platen 26 in the main scanning direction, that is, outside an image reading area, and thus, image deterioration does not occur. Further, the stains and scratches are not visible to the user, and thus, the appearance of the image reading device 10 does not deteriorate.

Figure 8:
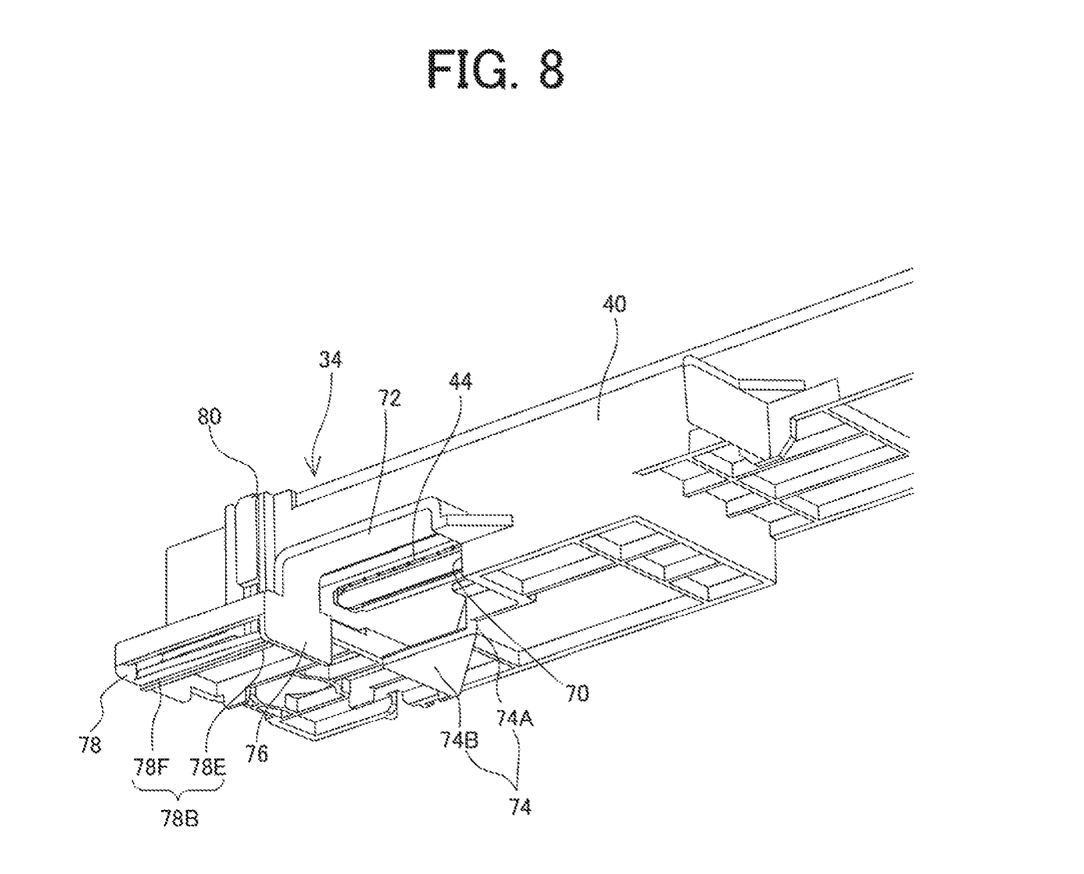
FIG. 8 is a perspective view illustrating the rear end portion of the scanning body before the flat cable is connected.
Figure 9:
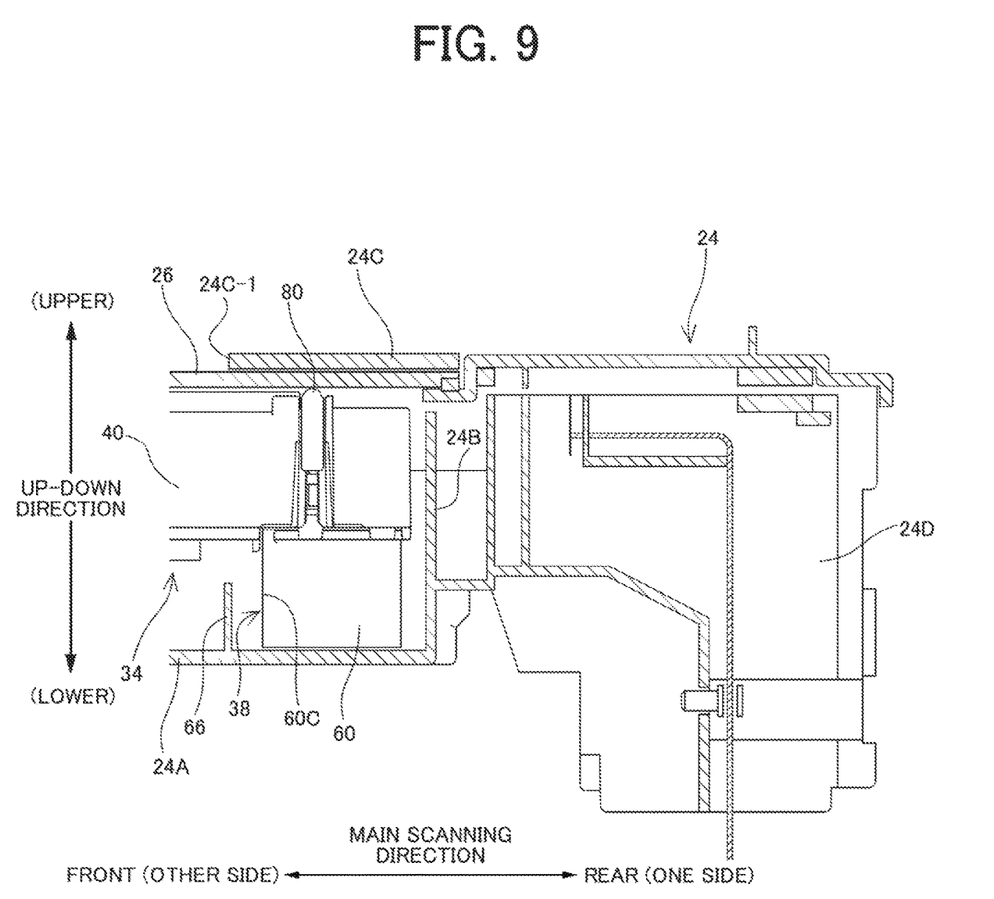
FIG. 9 is a cross-sectional view illustrating a rear end portion of the image reading device taken along line IX-IX in FIG. 2.

Next, the structure for holding the flat cable 38 by the CIS scanning body 34 will be described. An opening 70 from which the connector 44 is exposed is formed at the lower part of the left side surface of the rear end of the base 40 of the CIS scanning body 34. The opening 70 is formed to extend from the lower part of the left side surface to the lower surface side of the base 40. That is, the opening 70 is formed to cut out the lower left corner of the base 40 in a substantially L-shaped cross section in side view. Thus, the circuit board of the image reader 42 easily radiates heat. Further, on the left side surface of the base 40, an eave 72 protruding in the main scanning direction, the sub scanning direction, and an up-down direction is formed along the upper edge of the opening 70. The eave 72 is used as an insertion guide when the one end of the flat cable 38 is inserted into the connector 44, and functions as a protector that protects the connection state between the connector 44 and the one end of the flat cable 38.

The holder 74 that holds the bent section 62 of the flat cable 38 is formed on the lower surface of the base 40. More specifically, the holder 74 includes a base section 74a and a flat plate section 74b. The base section 74a protrudes downward from the lower surface of the base 40 along a coupling section (folding section) between the second section 62b and the third section 62c of the bent section 62. That is, the base section 74a extends in an oblique direction at an angle of 45 degrees with respect to each of the main scanning direction and the sub scanning direction. The base section 74a restricts a movement (positional displacement) of the bent section 62 to the other side (front side) in the main scanning direction and the other side (right side) in the sub scanning direction. On the other hand, the flat plate section 74b is formed in a triangular plate shape extending in parallel with the lower surface of the base 40 from the tip end of the base section 74a. The flat plate section 74b supports the left front side portion of the bent section 62, that is, the portion on the one end side of the third section 62c from the lower surface side, and restricts a downward movement of the bent section 62. It is noted that an upward movement of the bent section 62 is restricted by the lower surface of the base 40. That is, the lower surface of the base 40 can be referred to as an upper restricting part of the bent section 62.

Further, a rectangular flat plate-shaped protrusion 76 extending in the sub scanning direction is formed on the lower surface of the base 40. The protrusion 76 is inserted between the second section 62b and the third section 62c of the bent section 62, and protrudes below the surface of the first section 62a and the surface of the second section 62b in the up-down direction (thickness direction), to restrict a movement of the bent section 62 in the main scanning direction. Further, the other side (right side) edge of the protrusion 76 in the sub scanning direction restricts a movement of the bent section 62 to one side (left side) in the sub scanning direction. The protrusion 76 restricts a movement of the bent section 62 to the left, so that a load on the connector 44 can be reduced when the CIS scanning body 34 reciprocates.

Figure 10:
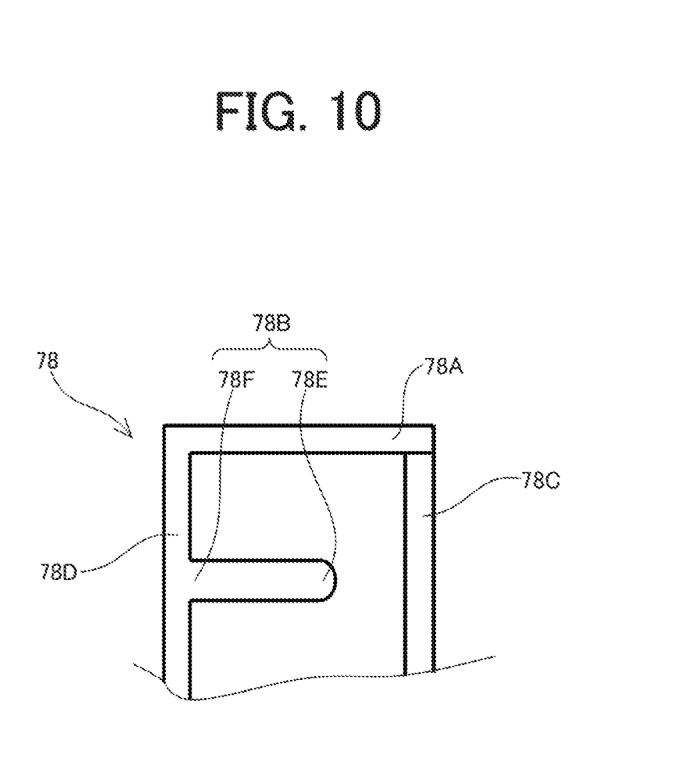
FIG. 10 is a view of a lower edge 78b in FIG. 8 as viewed from below.

Further, a substantially rectangular frame-shaped guide 78 formed by four edges, that is, upper and lower edges and front and rear edges, is formed at the lower left corner of the base 40. A coupling section between the follow-up deformed section 60 and the bent section 62 of the flat cable 38 is inserted into the guide 78. An upper edge 78a of the guide 78 guides the curved section 60b so that the curved section 60b of the follow-up deformed section 60 is easily curved downward. Further, a lower edge 78b of the guide 78 functions as a second holder that holds the bent section 62 by supporting the coupling section from the lower surface side. Further, a front edge 78c and a rear edge 78d of the guide 78 sandwich the coupling section from both sides in the main scanning direction to restrict a movement of the follow-up deformed section 60 and the bent section 62 in the main scanning direction. The front edge 78c is also the above-mentioned protrusion 76, and the protrusion 76 also sandwiches the coupling section with the rear edge 78d of the guide 78. As illustrated in FIG. 10, a notch is formed at a front side end 78e of the lower edge 78b in the guide 78, and the coupling section between the follow-up deformed section 60 and the bent section 62 is fitted into the guide 78 via the notch. That is, as illustrated in FIG. 8, a rear side end 78f of the lower edge 78b is connected to the rear edge 78d, and at the front side end 78e of the lower edge 78b, a notch provided at a predetermined interval from the front edge 78c is formed and the front side end 78e is not connected to the front edge 78c. The interval may have a width allowing the flat cable 38 to be easily inserted from the interval.

Further, the CIS scanning body 34 includes a slider (sliding material) 80 that slides while abutting against the lower surface of the document platen 26. The slider 80 is made of a material such as polyoxymethylene (POM) having a small friction coefficient with respect to the document platen 26 and is provided at both ends of the base 40 in the main scanning direction. The slider 80 slides with abutting against the lower surface of the document platen 26, and thus, smoothly reciprocally moves the CIS scanning body 34 in the sub scanning direction while the distance between the document platen 26 and the image reader 42 is maintained constant.

In the present embodiment, the slider 80 provided at the rear end of the base 40 is arranged within the width of the follow-up deformed section 60 in the main scanning direction, that is, right above the follow-up deformed section 60. If the bent section 62 of the flat cable 38 is placed on the lower surface of the base 40, the curved section 60b of the follow-up deformed section 60 is also placed below the base 40. Therefore, if the dimension of the housing 24 in the up-down direction is small and the distance between the bottom plate 24a and the lower surface of the base 40 is short, the rear end of the base 40 may be lifted by the curved section 60b of the flat cable 38. On the other hand, if the slider 80 is placed right above the follow-up deformed section 60, the lifting of the rear end of the base 40 is prevented by the slider 80, and thus, the CIS scanning body 34 is reciprocated in a well-balanced manner.

As described above, according to the first embodiment, the bent section 62 of the flat cable 38 and the holder 74 for the bent section 62 are arranged on the lower surface of the base 40, and thus, the housing 24 that accommodates the bent section 62 and the holder 74, and the image reading device 10 can be downsized in the sub scanning direction.

Further, the upward displacement of the bent section 62 is restricted by pressing the upper surface of the bent section 62 by the lower surface of the base 40, and thus, the holder 74 only needs to support the lower surface side of the bent section 62. Therefore, the structure of the holder 74 can be simplified, and the influence on the dimension of the base 40 in the up-down direction (thickness direction) is small, and thus, the structure does not affect the need for downsizing the image reading device 10 in the up-down direction.

Further, the bent section 62 is formed in the flat cable 38 and the follow-up deformed section 60 is arranged below the upper housing 24c, and thus, even if the document platen 26 is stained due to the contact with the follow-up deformed section 60, image deterioration does not occur, and the appearance of the image reading device 10 does not deteriorate.

Second Embodiment

Next, the image reading device 10 according to a second embodiment of the present invention will be described. In the above-described first embodiment, the connector 44 of the image reader 42 is provided on one end surface (left side surface) of the CIS scanning body 34 in the sub scanning direction, however, in the second embodiment, the connector 44 of the image reader 42 is provided at the other end surface (right side surface) of the CIS scanning body 34 in the sub scanning direction. The configuration of the other portions is similar to that in the first embodiment, and thus, a duplicated description will be omitted.

Also in the second embodiment, similarly to the first embodiment, the image reading device 10 can be downsized in the sub scanning direction.

Third Embodiment

Next, the image reading device 10 according to a third embodiment of the present invention will be described in the above-described first and second embodiments, the connector 44 of the image reader 42 is provided at a rear part of the CIS scanning body 34 in the main scanning direction, however, in the third embodiment, the connector 44 of the image reader 42 is provided at a front part of the CIS scanning body 34 in the main scanning direction. The configuration of the other portions is similar to that in the first and second embodiments, and thus, a duplicated description will be omitted.

Also in the third embodiment, similarly to the first and second embodiments, the image reading device 10 can be downsized in the sub scanning direction.

In the above-described embodiments, the CIS scanning body 34 is employed for a scanning body. However, a scanning body utilizing a charge coupled device (Cm sensor may be employed instead of the CIS scanning body 34.

Further, in the above-described embodiments, the image forming apparatus 100 including the electrophotographic image former 18 is exemplified. However, an ink jet image former may be employed for the image former.

It is noted that the specific numerical values, component shapes, and the like described above are merely examples, and can be appropriately changed as necessary, depending on the product specifications, and the like.

What is claimed is:

1. An image reading device, comprising:
   a housing with a document platen provided on an upper surface of the housing;
   a scanning body including a base provided to be reciprocally movable in a sub scanning direction in the housing and an image reader that is held by the base and reads a document placed on the document platen while moving in the sub scanning direction; and
   a flat cable having flexibility, one end of which is connected to the image reader to be parallel with the document platen, wherein
   the flat cable includes:
      a follow-up deformed section that is wired to extend along the sub scanning direction and deforms following a movement of the scanning body; and
      a bent section continuing into a side of the one end of the follow-up deformed section and being bent so that the flat cable is aligned in a main scanning direction to be parallel with the document platen,
   the bent section is arranged along a lower surface of the base, and the base includes a holder that holds the bent section on the lower surface of the base.

2. The image reading device according to claim 1, wherein the flat cable includes a coupling section continuing into the side of the one end of the bent section and extending to the one end along a side surface of the scanning body.

3. The image reading device according to claim 1, further comprising a protrusion formed on the lower surface of the base to be inserted between the flat cable aligned in the main scanning direction in the bent section of the flat cable.

4. The image reading device according to claim 3, wherein one end edge of the protrusion in the sub scanning direction restricts the bent section in the sub scanning direction.

5. The image reading device according to claim 1, wherein the scanning body includes a slider abutting against a lower surface of the document platen, and
the slider is arranged within a width of the follow-up deformed section in the main scanning direction.

6. The image reading device according to claim 1, wherein the housing includes an upper housing that covers a peripheral edge of an upper surface of the document platen, and
the follow-up deformed section is arranged at a position where the follow-up deformed section is covered from above by the upper housing.

7. An image forming apparatus comprising the image reading device according to claim 1.

* * * * *